United States Patent [19]

Murro

[11] 4,209,081
[45] Jun. 24, 1980

[54] CONSTANT PRESSURE LUBRICATOR FOR BEARINGS

[76] Inventor: Ronald P. Murro, Martingale Rd., Amherst, N.H. 03031

[21] Appl. No.: 952,312

[22] Filed: Oct. 18, 1978

[51] Int. Cl.² ............................................. F16N 11/04
[52] U.S. Cl. .................................... 184/41; 184/45 A; 267/156
[58] Field of Search .................... 184/45 R, 45 A, 54, 184/37, 39, 14; 267/156

[56] References Cited

U.S. PATENT DOCUMENTS

| | | | |
|---|---|---|---|
| 881,896 | 3/1908 | Brown | 184/4 |
| 1,209,805 | 12/1916 | Boe | 184/39 UX |
| 1,960,441 | 5/1934 | Hutlleston | 184/45 R X |
| 1,989,451 | 1/1935 | Hull | 184/45 R |
| 2,635,282 | 4/1953 | Trammell et al. | 267/156 X |
| 3,103,034 | 9/1963 | Fisher | 267/156 X |
| 3,154,280 | 10/1964 | Wiese | 267/156 X |
| 3,581,774 | 6/1971 | Oeland | 138/31 |

*Primary Examiner*—Davis H. Brown
*Attorney, Agent, or Firm*—Pearson & Pearson

[57] ABSTRACT

A permanently installed lubrication system supplies grease under constant pressure to bearings, or other mechanism at near or remote locations, by means of constant spring tension rather than conventional coil spring expansion on a piston, or plunger, head. Influent and effluent fluid conduit connections into the piston head cylinder permit absolute or differential pressures from about 26 to about 185 pounds per square inch. A pair of back to back constant pressure, coiled band springs exert constant tension and are supported between a pair of T-shaped plates affixed to one end of an elongated, hollow tubular housing.

9 Claims, 3 Drawing Figures

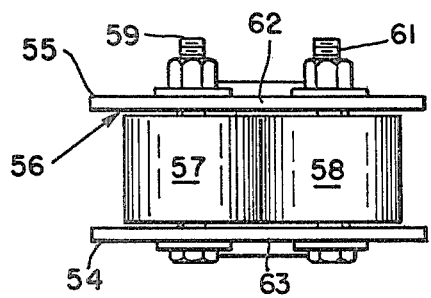
*Fig.1.*
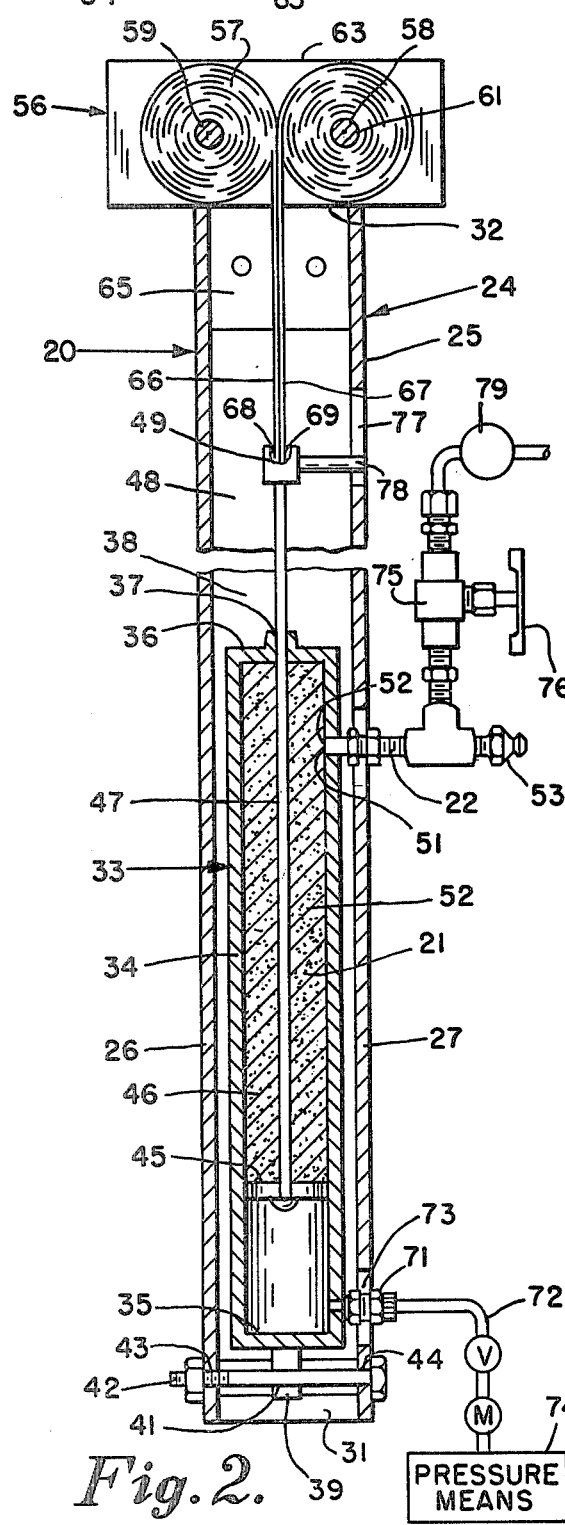
*Fig.2.*   *Fig.3.*

CONSTANT PRESSURE LUBRICATOR FOR BEARINGS

BACKGROUND OF THE INVENTION

It has heretofore been proposed to compress a helically coiled spring and to then permit the spring to expand while pushing a plunger within a cylinder, so that lubricant is dispensed from the cylinder under pressure to a bearing. Exemplary of such devices are those disclosed in the following U.S. Pat. Nos.:

1,489,999 to Gallipoli of Apr. 8, 1924
3,393,846 to Sundholm of July 23, 1968
1,676,358 to Schott of July 10, 1928
2,925,147 to Minera of Feb. 16, 1960
3,780,830 to Helgerud of Dec. 25, 1973
3,595,340 to Obergefell, July 27, 1971

In an early U.S. Pat. No. 881,896 to Brown of Mar. 17, 1908, a windmill oiler is disclosed, in which a tension spring applies pressure on the piston head by pulling thereon, instead of the conventional pushing on the piston head as in the above patents.

It has also been proposed to provide a single, substantially constant-pressure, coiled bandspring, immersed in the hydraulic fluid charge in a cylinder, to apply a constant pressure on a rolling diaphragm type piston as in U.S. Pat. No. 3,581,774 to Oeland, Jr., et al of June 1, 1971.

A pair of back-to-back constant force springs are disclosed in U.S. Pat. No. 2,635,282 to Trammell of Apr. 21, 1953 detachably connected to one side of a window sash by hooks.

SUMMARY OF THE INVENTION

In this invention a piston head and piston rod are reciprocable in a closed cylinder which contains a charge of grease. Unlike the above mentioned Oeland accumulator, the piston rod extends from one end of the cylinder and is permanently connected to the juxtaposed, relatively rigid, pair of unwound, straight bands of a pair of balanced, back-to-back coiled band, constant pressure springs outside of the grease supply in the container.

Unlike any of the above patents the closed cylinder is anchored within an elongated hollow tubular housing of rectangular cross section, at one end thereof, and the pair of springs are supported in a T-shaped frame affixed to the other end of the housing, with the push rod, unwound bands, clevis connection and fill indicator all within the housing.

The lubricator of the invention while providing constant pressure lubrication also includes an influent fluid conduit into the other side of the piston head in the container and fluid pressure supply means selectively connected thereto to provide supplementary pressure and enable a wide range of absolute or differential pressures to the bearings being lubricated.

BRIEF DESCRIPTION OF THE DRAWING

FIG. 1 is a top plan view;
FIG. 2 is a front elevation in half section; and
FIG. 3 is a side elevation partly in half section of the constant pressure lubricator of the invention.

DESCRIPTION OF A PREFERRED EMBODIMENT

As shown in the drawing, the constant pressure lubricator 20, of the invention, is for the purpose of automatically delivering grease 21, through a grease discharge conduit 22 to a "hard to get at" bearing 23 or other remote lubrication point at constant absolute, or differential pressure.

Lubricator 20 includes an elongated hollow tubular housing 24 of metal 25 and preferably of rectangular, or square, cross section with walls 26, 27, 28 and 29, an open end 31 and an opposite open end 32.

An elongated, sealed, container 33 having a cylindrical side wall 34, a closed end 35 and an opposite end 36, with a pull rod aperture 37 is wholly enclosed within the space 38 in housing 20.

The closed end 35 of container 33 includes an integral boss, or stud, 39 having a transverse aperture 41 for an anchor bolt 42, the bolt 42 being received in oppositely disposed holes 43 and 44 in side walls 26 and 27 and anchoring the end 35 of cylindrical container 20 across the open end 31 of the housing.

A piston, or plunger, head 45 is axially slidable in the interior 46 of container 33 from proximate the closed end 35 toward the opposite end 36, by means of the elongated pull rod, 47, which is slidable in pull rod aperture 37 in the closed end 36. The pull rod 47 extends outwardly from head 45 into the space 38 in the remaining portion 48 within housing 20 and terminates in a clevis coupling 49.

The grease discharge conduit 22 passes through cylindrical side wall 34 of container 33, and through a hole in the adjacent side wall 27, of housing 20, to port 51 located proximate the closed end 36 of the container. Thus a charge 52 of grease 21 may be inserted into the interior 46 of container 33 through the grease fitting 53 in conduit 22 to move the head 45 back to the end 35 as shown in FIG. 1.

A pair of T shaped plates 54 and 55, form a frame 56 to support a pair of back to back, coiled band, constant force, springs 57 and 58, by means of shafts 59 and 61 extending between the cross bar portions 62 and 63 of the plates.

The stems 64 and 65 of the plates 54 and 55 of frame 56 are affixed by welds, or rivets 70 within the walls 28 and 29 of housing 20.

The constant force extension springs 57 and 58 are commercially available under the Trademark "NEGATOR" and each constitutes a pre-stressed strip, or band, of flat spring stock coiled tightly around a bushing and around several layers of itself to develop its resisting force incrementally rather than cumulatively. The back-to-back mounting of the two constant force springs 57 and 58 makes available the sum of their two forces at one point of application and provides doubled, juxtaposed straight, unwound portions 66 and 67, extending within space 38 to terminal tips 68 and 69 affixed to the clevis coupling 49, and forming a semi-rigid column with no tendency to tilt, or unbalance.

Thus, a balanced constant tension force, or pull is uniformly and continuously exerted through rod 47, on head 45 and grease charge 52 to discharge grease into the outwardly projecting grease discharge conduit 22 and thence to a bearing 23.

A pressure assist, or vent, fitting 71 is provided in cylindrical wall 34 of container 33, connected by a conduit 72, which passes through an aperture 73 in side wall 27 of housing 20 and leads to a fluid pressure supply means 74 which may be a gas, or liquid, pump and tank or may be a mill supply of pressurized fluid together with suitable reducing valves v, meters M, control and shut off valves all of well known construction and commercially available.

Thus the constant force exerted by pull rod 47 and springs 57 and 58 may be absolute, or may be differential by applying assist or supplementary pressure through fitting 71 from pressure supply means 74.

The discharge conduit 22 includes a needle valve 75, which is manually operable by handle 76 to control the volume and rate of grease discharged through the conduit to the remotely located bearing 23.

An elongated slot opening 77, in side wall 27, extends along the pull path of clevis coupling 49. A sidewise extending projection 78, affixed proximate coupling 49 on the pull rod 47, is visible in the slot 77 from outside of the housing and moveable therealong to visually indicate the amount of the charge 52 remaining in container 33.

I use the term "absolute" to mean gauge pressure. In operation, if the constant force springs exert a predetermined force so that absolute, or gauge, pressure of the grease to the bearings is, for example, forty p.s.i., and if a lesser pressure such as thirty p.s.i. is desired, it is only necessary to adjust the needle valve 75, thereby reducing the size of the orifice, to attain the desired pressure.

A cut off valve 79 is also provided in conduit 22, and it can be automatically controlled by a solenoid and a timer.

In the example given above, wherein the springs create a gauge pressure of forty p.s.i., and it develops that fifty p.s.i., for example is desired, it is only necessary to apply fluid pressure, such as air, to the pressure assist fitting 71, from supply means 74, thereby supplementing spring pressure.

I claim:

1. A constant pressure lubricator for bearings comprising:
    an elongated, hollow, tubular housing having opposite ends
    an elongated cylindrical container within said housing, said container having one end anchored proximate one end of said housing having an aperture in its opposite end and having a grease discharge conduit proximate its said opposite end projecting outwardly from said housing intermediate of the ends thereof;
    a piston head slidable in said container from said one end toward said discharge conduit, and having a piston rod extending therefrom, out through said aperture in said opposite end of said container,
    a T shaped frame affixed to said housing proximate the opposite end thereof;
    a pair of balanced, helical band, constant pressure, springs mounted back to back in said frame, the terminal tips of said springs being affixed to a clevis coupling, and said coupling being connected to said piston rod
    and a charge of grease in said container, between said piston head and said opposite end thereof
    said springs exerting constant pressure on said piston head to discharge grease at constant pressure.

2. A combination as specified in claim 1 wherein:
    said container includes an influent conduit in the side wall thereof
    and said lubricator includes fluid pressure supply means operably connected to said influent conduit,
    whereby supplementary pressure may be selectively exerted on said piston head to assist the tension of said springs.

3. A lubricator for dispensing grease under constant pressure to a bearing said lubricator comprising;
    an elongated housing having an anchor bolt extending across one end and having an opposite end;
    an elongated container within said housing having one end affixed to said anchor bolt and having a grease discharge conduit at its opposite end extending out of said housing intermediate of the length thereof for discharge of grease to a bearing;
    a piston head within, and normally proximate said one end of said container;
    a piston rod having one end affixed to said head and extending through said opposite end of said container to a clevis coupling outside said container;
    a charge of grease within said container in the space between said head and said opposite end of said container; and
    a frame affixed to said opposite end of said housing, said frame supporting a pair of back to back, constant pressure, coiled, band springs, each having a straight unwound portion juxtaposed to the other, the terminal tips thereof being secured to said coupling within said housing for exerting a constant tension on said piston head to dispense grease at a constant pressure.

4. A lubricator as specified in claim 3 wherein:
    said discharge conduit includes a manually operable needle valve for controlling the rate and volume of discharge therefrom.

5. A lubricator as specified in claim 3 wherein said discharge conduit includes a manually operable needle valve and a grease fitting for charging said container with grease.

6. A lubricator as specified in claim 3 plus:
    a pressure assist fluid fitting proximate said one end of said container for enabling absolute or differential pressures on said grease.

7. A lubricator as specified in claim 3 plus
    a pressure assist fitting at said one end of said container in rear of said piston head, and
    fluid pressure supply means, connectable to said fitting for producing supplementary pressure on said head.

8. A lubricator as specified in claim 3 wherein;
    said housing is an elongated metal tube of rectangular cross section
    and said frame comprises a pair of T shaped metal plates the stems thereof being each affixed to an opposite wall of said housing and said springs being affixed between the cross bars of said plates.

9. A lubricator as specified in claim 3 wherein:
    said housing includes an elongated slot in the portion of one wall thereof between said container and said frame
    and said piston rod includes a sidewise extending projection, visible in, and moveable in, said slot to indicate the amount of grease in said container.

* * * * *